Dec. 17, 1935.  E. HOFFMAN  2,024,223

SPOOL AND PROTECTOR THEREFOR

Filed Jan. 26, 1931

INVENTOR
BY Edmund Hoffman
John C. Carpenter
ATTORNEY

Patented Dec. 17, 1935

2,024,223

UNITED STATES PATENT OFFICE 2,024,223

SPOOL AND PROTECTOR THEREFOR

Edmund Hoffman, Brooklyn, N. Y., assignor to American Can Company, New York, N. Y., a corporation of New Jersey Application January 26, 1931, Serial No. 511,126

3 Claims. (Cl. 206—52)

The present invention relates to a spool assembly and has particular reference to an improved construction wherein the spool is removably retained in protected position within a protecting shell.

The principal object of the present invention is the provision of a spool adapted for telescopic engagement within a protecting shell, the spool being held therein by frictional engagement.

A further important object of the invention is the provision of a simple form of spool having an improved spool head which cooperates with a protecting shell, into which the spool is inserted, to removably hold the spool in its protected position.

Numerous other objects of the invention will be apparent as it is better understood from the following description, which, taken in connection with the accompanying drawing, discloses a preferred embodiment thereof.

Referring to the drawing.

Figure 1:
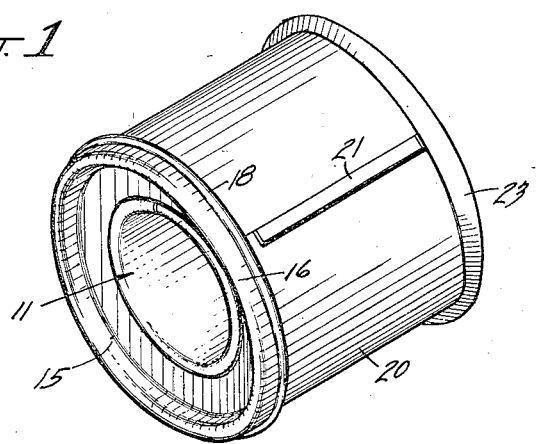
Figure 1 is a perspective view of the assembly unit illustrating the spool in closed and protected position.
Figure 2:
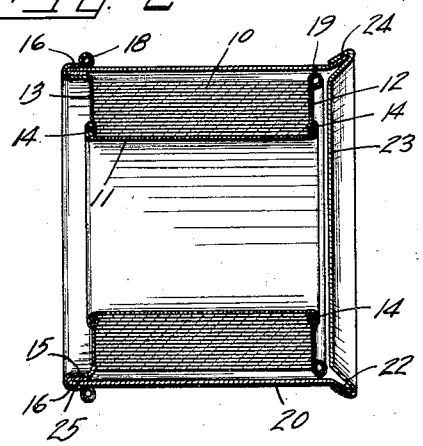
Fig. 2 is a longitudinal central section taken through the spool and its protecting shell, the spool being fully inserted.

The spool assembly unit illustrated in the drawing as a preferred exemplification of the invention, comprises a core member 11 having fixed heads 12 and 13 secured to its ends, in any suitable manner, as by double seams 14. Tape 10, or other material for use of which the spool is intended, is wound on the core 11 in the usual manner, being located between the fixed heads 12 and 13. The head 13 is drawn near its edge to provide spaced substantially parallel walls 15 and 16 which enclose and set off an annular channel 17, the wall 16 terminating in a curled edge 18. The head 12 of the spool is also provided with a curled edge 19.

A protecting shell is provided for the spool and comprises a shell body 20 which may be formed from strip material and joined in a side seam 21. This shell is flanged at 22 to provide a connection with an end member 23 which may be formed with a channeled flange 24 for that purpose. The opposite end of the shell 20 is bent back against its inside wall or hemmed at 25, this forming a smooth outer edge for the shell and providing a tightly fitting frictional connection with the channel 17 and elongated head 13 of the spool when the spool is inserted within the open end of the protecting shell.

Figure 3:
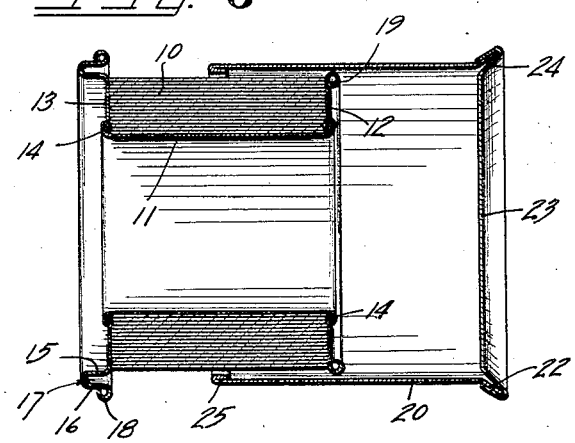
Fig. 3 is a view similar to Fig. 2 illustrating the spool partially withdrawn from the shell.
Figure 4:
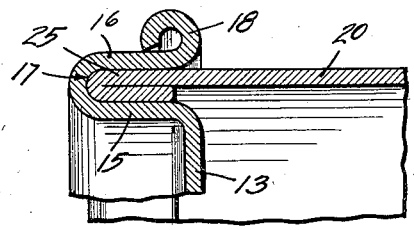
Fig. 4 is an enlarged sectional detail of one edge of the protecting shell and the spool head, illustrating these parts in the position occupied when the spool is fully inserted.

When the spool with its tape is enclosed within the protecting shell the hemmed edge 25 of the shell is fully engaged within the channel 17 formed in the spool head 13 and by reason of the resiliency of the side walls 15 and 16 sufficient friction is created to snap on and hold against the hemmed shell edge 25 and keep the spool rigidly in protected position. This forms a tight enclosure for the spool and its contents, protecting it against dust or other contamination. When it is desired to remove the spool from its protecting shell, the elongated head 13 is grasped at its curled edge 18 and the spool is easily withdrawn from the shell, a step in this withdrawing operation being illustrated in Fig. 3.

The spool just described is of simple construction being composed of only three parts and its protecting shell is likewise of simple construction consisting of but two parts. There are no exposed raw edges in either spool or shell. This gives that desirable quality of smoothness on the inner surface of the core 11 and permits rotation of the spool on the thumb of the user in removing the tape, without danger of cutting or other damage to the user. Formation of the elongated head 13 of the spool is of such a nature as to provide for all of the snapping in and holding elements necessary to retain the spool in its protected position. One end of the shell being permanently sealed and the opposite end being tightly closed by the end of the spool, the tape or other material wound on the spool is protected against dirt or other contamination. It will thus be seen that the spool assembly just described provides an efficient article of great utility and at a minimum of cost.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sealed sanitary package of rolled surgical material, comprising a spool permanently mounted upon a head, said head being removably secured upon an open ended otherwise imperforate cylindrical shell, the periphery of said head being provided with a relatively deep gripping and sealing channel proportioned to tightly and removably fit over the walls of the open end of the shell, whereby when closed the surgical material wound on the spool is protected against contamination.

2. A sealed sanitary package of rolled surgical material, comprising a spool permanently mounted upon a head, said head being removably secured upon an open ended otherwise imperforate cylindrical shell, the open end of said shell being folded upon itself, the periphery of said head being provided with a relatively deep gripping and sealing channel proportioned to tightly and removably fit over the folded wall portion of the open end of the shell, whereby when closed the surgical material wound on the spool is protected against contamination.

3. A sealed sanitary package of rolled surgical material, comprising a spool permanently mounted upon a head, said head being removably secured upon an open ended otherwise imperforate cylindrical shell, the open end of said shell being folded upon itself, the periphery of said head being provided with a relatively deep gripping and sealing channel proportioned to tightly and removably fit over the folded wall portion of the open end of the shell, the said head projecting radially beyond the shell and providing a hand hold for the spool, whereby when closed the surgical material wound on the spool is protected against contamination.

EDMUND HOFFMAN.